(12) United States Patent
Peiffer et al.

(10) Patent No.: US 7,396,578 B2
(45) Date of Patent: *Jul. 8, 2008

(54) ADHESION-PROMOTED, HEATSEALABLE AND PEELABLE POLYESTER FILM, PROCESS FOR ITS PRODUCTION AND ITS USE

(75) Inventors: Herbert Peiffer, Mainz (DE); Bart Janssens, Wiesbaden (DE); Matthias Konrad, Hofheim (DE); Andreas Stopp, Ingelheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 494 days.

This patent is subject to a terminal disclaimer.

(21) Appl. No.: 10/984,727

(22) Filed: Nov. 9, 2004

(65) Prior Publication Data

US 2005/0118412 A1 Jun. 2, 2005

(30) Foreign Application Priority Data

Nov. 10, 2003 (DE) ................. 103 52 444

(51) Int. Cl.
 *B32B 27/08* (2006.01)
 *B32B 27/18* (2006.01)
 *B32B 27/36* (2006.01)
 *B32B 37/15* (2006.01)

(52) U.S. Cl. .............. 428/141; 428/215; 428/216; 428/334; 428/335; 428/336; 428/323; 428/347; 428/349; 428/355 R; 428/480; 428/910; 525/437; 525/444; 528/302; 528/308; 528/308.6; 528/308.7; 264/171.16; 264/171.19; 264/288.4; 264/290.2

(58) Field of Classification Search .............. None
See application file for complete search history.

(56) References Cited

U.S. PATENT DOCUMENTS 4,252,885 A 2/1981 McGrail et al. ............. 430/160

(Continued)

FOREIGN PATENT DOCUMENTS

DE 109 224 11/1974

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

*Primary Examiner*—Vivian Chen
(74) *Attorney, Agent, or Firm*—ProPat, L.L.C.

(57) ABSTRACT

Coextruded, biaxially oriented polyester films which have a base layer (B) and have a heatsealable outer layer (A) that can be peeled from APET/CPET and from CPET, where the outer layer (A) includes
a) from 60 to 99% by weight of polyester and
b) from 1 to 10% by weight of inorganic and/or organic particles with a median diameter $d_{50}$ of from 2 to 8 µm, and where
c) the polyester is composed of from 12 to 89 mol % of units derived from at least one aromatic dicarboxylic acid and of from 11 to 88 mol % of units derived from at least one aliphatic dicarboxylic acid,
and the non-sealable surface of the film has been rendered adhesion-promoting. The films of the invention are suitable as a packaging material for foods and other consumable items, and as a lid film for APET/CPET or CPET trays.

29 Claims, 3 Drawing Sheets

U.S. PATENT DOCUMENTS

| | | | |
|---|---|---|---|
| 4,375,494 A * | 3/1983 | Stokes | 428/323 |
| 5,059,470 A * | 10/1991 | Fukuda et al. | 428/142 |
| 5,458,965 A * | 10/1995 | Yoshinaka et al. | 428/323 |
| 5,747,174 A * | 5/1998 | Kimura et al. | 428/480 |
| 7,141,293 B2 * | 11/2006 | Peiffer et al. | 428/141 |
| 7,144,615 B2 * | 12/2006 | Peiffer et al. | 428/141 |
| 7,186,452 B2 * | 3/2007 | Peiffer et al. | 428/141 |
| 7,205,040 B2 * | 4/2007 | Peiffer et al. | 428/141 |
| 7,211,306 B2 * | 5/2007 | Peiffer et al. | 428/323 |
| 2004/0146727 A1 | 7/2004 | Hilkert et al. | 428/480 |
| 2005/0042439 A1 * | 2/2005 | Peiffer et al. | 428/323 |
| 2005/0074598 A1 * | 4/2005 | Peiffer et al. | 428/323 |
| 2005/0074599 A1 * | 4/2005 | Peiffer et al. | 428/323 |
| 2005/0074619 A1 * | 4/2005 | Peiffer et al. | 428/480 |
| 2005/0100718 A1 * | 5/2005 | Peiffer et al. | 428/200 |
| 2005/0100729 A1 * | 5/2005 | Peiffer et al. | 428/323 |
| 2005/0100750 A1 * | 5/2005 | Peiffer et al. | 428/482 |
| 2005/0121822 A1 * | 6/2005 | Peiffer et al. | 264/173.16 |
| 2005/0173050 A1 * | 8/2005 | Peiffer et al. | 156/244.11 |

FOREIGN PATENT DOCUMENTS

| | | |
|---|---|---|
| DE | 237 070 A3 | 7/1986 |
| EP | 0 035 835 A1 | 9/1981 |
| EP | 0 144 878 | 11/1984 |
| EP | 0 144 948 | 12/1984 |
| EP | 0 156 464 A1 | 10/1985 |
| EP | 0 283 164 A2 | 9/1988 |
| EP | 0 296 620 A2 | 12/1988 |
| EP | 0 379 190 * | 1/1990 |
| EP | 0 379 190 A2 | 7/1990 |
| EP | 0 407 870 A2 | 1/1991 |
| EP | 0 485 893 A1 | 5/1992 |
| EP | 0 503 422 A1 | 9/1992 |
| EP | 0 515 096 A2 | 11/1992 |
| EP | 1 471 098 | 1/1993 |
| EP | 1 068 949 A1 | 1/2001 |
| EP | 1 176 005 A2 | 1/2002 |
| EP | 1 457 316 | 9/2004 |
| EP | 1 457 317 A1 | 9/2004 |
| EP | 1 471 094 * | 10/2004 |
| EP | 1 471 096 * | 10/2004 |
| EP | 1 471 097 * | 10/2004 |
| EP | 1 471 098 * | 10/2004 |
| EP | 1 475 229 A2 | 11/2004 |
| JP | 05-009319 A | 1/1993 |
| JP | 2001002800 A1 | 1/2001 |
| WO | WO 94/13476 A1 | 6/1994 |
| WO | WO 94/13481 A1 | 6/1994 |
| WO | WO 96/19333 * | 6/1996 |
| WO | WO 96/19333 A1 | 6/1996 |
| WO | WO 02/26493 A1 | 4/2002 |
| WO | WO 02/059186 A1 | 8/2002 |
| WO | WO 03/026892 A1 | 4/2003 |

\* cited by examiner

ADHESION-PROMOTED, HEATSEALABLE AND PEELABLE POLYESTER FILM, PROCESS FOR ITS PRODUCTION AND ITS USE

CROSS REFERENCE TO RELATES APPLICATIONS

This application claims priority to its parent application, German Patent Application 103 52 444.4, filed Nov. 10, 2003, hereby incorporated by reference herein in its entirety.

FIELD OF THE INVENTION

The invention relates to a biaxially oriented polyester film coated on at least one side which can be used, for example, as a lid film for containers (trays, yogurt cups, etc.). The polyester film includes a base layer (B) and at least one outer layer (A) applied to this base layer (B). The outer layer (A) is heatsealable and features, for example, easy to moderate peelability from APET and CPET. The inventive film has at least one surface which has good adhesion to other polymer or metal layers or printing inks. The invention further relates to a process for producing the film and to its use.

BACKGROUND DO THE INVENTION

Ready-prepared meals which are enjoying increased growth rates in Europe are transferred to trays after their preparation (cf. FIG. 1). A film which is heat sealed to the edge of the tray seals the packaging and protects the ready-prepared meal from external influences. The ready-prepared meals are suitable, for example, for heating in a microwave and in a conventional oven. The ready meal and the packaging have to be "dual ovenable" (=suitable for microwave and conventional ovens). As a consequence of the temperatures existing in a conventional oven (up to 220° C.), particularly high demands are made on the packaging material (tray and lid film).

Typical materials, suitable for microwave and conventional ovens, for the tray and the lid film are (PET=polyethylene terephthalate, CPET=crystalline PET, APET=amorphous PET)

Tray: CPET, aluminum, cardboard coated with PET or with PET film or trays made of APET/CPET. Trays made of APET/CPET (cf. FIG. 1) include externally a CPET layer and internally, i.e. facing toward the ready-prepared meal, an APET layer. The thick, crystalline CPET layer provides the stability of the tray, even at the comparatively high temperatures in a conventional oven. The amorphous PET essentially improves the adhesion of the film to the tray.

Lid film: here, PET is generally used which remains dimensionally stable and solid enough even at 220° C. Materials such as PP and PE are ruled out owing to their low melting points. The demands on the lid film are best fulfilled by biaxially oriented polyester films.

When preparing the ready-prepared meal in an oven, the polyester film is removed by hand from the tray shortly before heating or shortly after heating. When this is done, the polyester film must on no account start to tear, start and continue to tear or tear off. The removal of the film from the tray without the film starting or continuing to tear or tearing off is also referred to in the foods industry as peeling. For this application, the polyester film therefore has to be not only heatsealable, but in particular also peelable. For a given material and given overall thickness of the film, the peelability of the film is determined mainly by the properties of the surface layer of the film which is sealed to the tray.

The peelability of films can be determined relatively simply in the laboratory using a tensile strain tester (for example from Zwick, Germany) (cf. FIG. 2). For this test, two strips of width 15 mm and length approx. 50 mm are cut out of the polyester film and the tray and sealed to one another. The sealed strips are, as shown in FIG. 2, clamped into the clips of the tester. The "angle" between the film clamped in the upper clip and the tray strip is 180°. In this test, the clips of the tester are moved-apart at a speed of 200 mm/min, and in the most favorable case the film is fully peeled off from the tray (cf., for example, ASTM-D 3330).

In this test, a distinction is to be drawn between essentially two different mechanisms.

In the first case, the tensile force rises rapidly in the course of the pulling procedure up to a maximum (cf. FIG. 3a) and then falls directly back to zero. When the maximum force is attained, the film starts to tear or, before delamination from the tray, tears off, which results in the force falling immediately back to zero. The film is in this case not peelable, since it is destroyed. The behavior of the film can rather be described as a kind of "welding" to the tray. The destruction of the film on removal from the tray is undesired, because this complicates the easy opening of the packaging without tools such as scissors or knives.

In contrast, a peelable film is obtained when the tensile force or the peeling force rises up to a certain value (i.e. up to a certain plateau) and then remains approximately constant over the distance over which the two strips are sealed together (cf. FIG. 3b). In this case, the film does not start to tear, but rather can be peeled as desired off the tray with a low force input.

The size of the peeling force is determined primarily by the polymers used in the outer layer (A) (cf. FIG. 4, polymer 1 and polymer 2). In addition, the size of the peeling force is dependent in particular on the heatsealing temperature employed. The peeling force generally rises with the heatsealing temperature. With increasing heatsealing temperature, the risk increases that the sealing layer might lose its peelability. In other words, a film which is peelable when a low heatsealing temperature is employed loses this property when a sufficiently high heatsealing temperature is employed. This behavior is to be expected in particular in the case of polymers which exhibit the characteristics shown in FIG. 4 for polymer 1. This behavior which tends to generally occur but is rather unfavorable for the application has to be taken into account when designing the sealing layer. It has to be possible to heatseal the film in a sufficiently large temperature range without the desired peelability being lost (cf. polymer 2 in FIG. 4). In practice, this temperature range is generally from 150 to 220° C., preferably from 150 to 200° C. and more preferably from 150 to 190° C.

The heatsealable and peelable layer is applied to the polyester film in accordance with the prior art, generally by means of offline methods (i.e. in an additional process step following the film production). This method initially produces a "standard polyester film" by a customary process. The polyester film produced in this way is then coated offline in a further processing step in a coating unit with a heatsealable and peelable layer. In this process, the heatsealable and peelable polymer is initially dissolved in an organic solvent. The final solution is then applied to the film by a suitable application process (knifecoater, patterned roller, die). In a downstream drying oven, the solvent is evaporated and the peelable polymer remains on the film as a solid layer.

Such an offline application of the sealing layer is comparatively expensive for several reasons. First, the film has to be coated in a separate step in a special apparatus. Second, the evaporated solvent has to be condensed again and recycled, in order thus to minimize pollution of the environment via the waste air. Third, complicated control is required to ensure that the residual solvent content in the coating is very low. Moreover, in an economic process, the solvent can never be completely removed from the coating during the drying, in particular because the drying procedure cannot be of unlimited duration. Traces of the solvent remaining in the coating subsequently migrate via the film disposed on the tray into the foods where they can distort the taste or even damage the health of the consumer.

Various peelable, heatsealable polyester films which have been produced offline are offered on the market. The polyester films differ in their structure and in the composition of the outer layer (A). Depending on their (peeling) properties, they have different applications. It is customary, for example, to divide the films from the application viewpoint into films having easy peelability (easy peel), having moderate peelability (medium peel) and having strong, robust peelability (strong peel). The essential quantifiable distinguishing feature between these films is the size of the particular peeling force according to FIG. 3b. A division is undertaken at this point as follows:

| Easy peelability (easy peel) | Peeling force in the range from about 1 to 4 N per 15 mm of strip width |
|---|---|
| Moderate peelability (medium peel) | Peeling force in the range from about 3 to 8 N per 15 mm of strip width |
| Strong, robust peelability (strong peel) | Peeling force in the range of more than 5 N per 15 mm of strip width |

Sealable PET films and processes for their production are known.

EP-A 0 379 190 describes a biaxially oriented, multilayer polyester film comprising a carrier layer of polyester and at least one sealing layer of a polyester composition. The polyester film cam be produced by employing coextrusion technology, inline coating, inline lamination or employing suitable combinations of the technologies mentioned. In inline coating, the polymers of the sealing layer are applied to the carrier layer in the form of a dispersion or solution. In inline lamination, the polymers of the sealing layer are applied to the carrier layer in the form of extruded melt, for example between the two stretching steps.

The sealing layer may comprise aliphatic and aromatic dicarboxylic acids and also aliphatic diols. The polymer for the sealing layer comprises two different polyesters A and B, of which at least one (polyester B) contains aliphatic dicarboxylic acids and/or aliphatic diols. The sealing energy which is measured between two sealing film layers facing each other and bonded together (=FIN sealing) is more than 400 $g_{force}$*cm/15 mm (=more than 4 N*cm/15 mm), and the sealing film layer may comprise inorganic and/or organic fine particles which are insoluble in the polyester, in which case the fine particles are present in an amount of from 0.1 to 5% by weight, based on the total weight of the sealing film layer. Although the film features good peeling properties (having plateau character in the peeling diagram, see above) with respect to itself (i.e. sealing layer with respect to sealing layer), there is no information about the peeling performance with respect to trays made of APET, CPET and APET/CPET. In particular, the film of this invention is in need of improvement in its producibility and its processability.

WO A-96/19333 describes a process for producing peelable films, in which the heatsealable, peelable layer is applied inline to the polyester film. In the process, comparatively small amounts of organic solvents are used. The heatsealable, peelable layer comprises a copolyester which has a) from 40 to 90 mol % of an aromatic dicarboxylic acid, b) from 10 to 60 mol % of an aliphatic dicarboxylic acid, c) from 0.1 to 10 mol % of a dicarboxylic acid containing a free acid group or a salt thereof, d) from 40 to 90 mol % of a glycol containing from 2 to 12 carbon atoms and e) from 10 to 60 mol % of a polyalkyldiol. The coating is applied to the film from an aqueous dispersion or a solution which contains up to 10% by weight of organic solvent. The process is restricted with regard to the polymers which can be used and the layer thicknesses which can be achieved for the heatsealable, peelable layer. The maximum achievable layer thickness is specified as 0.5 µm. The maximum seal seam strength is low, and is from 500 to 600 g/25 mm$^2$, or [(from 500 to 600)/170] N/15 mm of film width.

WO 02/059186 A1 describes a process for producing peelable films, in which the heatsealable, peelable layer is applied inline to the polyester film. The method employed is melt-coating, and it is preferably the longitudinally stretched film which is coated with the heatsealable, peelable polymer. The heatsealable polymer contains polyesters based on aromatic and aliphatic acids, and also based on aliphatic diols. The copolymers disclosed in the examples have glass transition temperatures of below −10° C.; such copolyesters are too soft, which is why they cannot be oriented in customary roll stretching methods (adhesion to the rolls). In WO 02/059186 A1, the melt-coating known per se is delimited from the extrusion coating known per se technically and by the viscosity of the melt. A disadvantage of the melt-coating is that only comparatively fluid polymers (max. 50 Pa·s) having a low molecular weight can be used. This results in disadvantageous peeling properties of the film. Moreover, the coating rate in this process is limited, which makes the production process uneconomic. With regard to quality, faults are observed in the appearance of the film which are visible, for example, as coating streaks. In this process, it is also difficult to obtain a uniform thickness of the sealing layer over the web width of the film, which in turn leads to nonuniform peeling characteristics.

SUMMARY OF THE INVENTION

It is an object of the present invention to provide a heatsealable and peelable, biaxially oriented polyester film for which the disadvantages of the prior art films are very substantially overcome. In particular, it is an aim to provide an economic process for the production of a heatsealable and peelable polyester film, in which it is possible to dispense with the use of toxicologically and environmentally controversial solvents from the outset. The film produced by means of the process according to the invention should in particular feature outstanding peeling properties with respect to food containers (trays, pots, etc.), especially with respect to those made of CPET, APET or the APET side of trays made of APET/CPET. In addition, it is an object of the invention to provide a film which has the following features:
    easy to moderate peelability (easy peel to medium peel) with respect to CPET or the APET side of trays made of APET/CPET. The peeling force should be in the range from 1.5 to 8 N for 15 mm, preferably in the range from 2.0 to 8 N for 15 mm and more preferably in the range from 2.5 to 8 N for 15 mm, of film strip width;

the heatsealable and peelable layer should not contain any organic solvent residues;

the heatsealable and peelable layer, with respect to CPET or the APET side of APET/CPET trays, has a minimum sealing temperature of 165° C., preferably 155° C., in particular 150° C., and the max. sealing temperature is generally 220° C., preferably 200° C. and more preferably 190° C.;

it is produced employing processes in which no organic solvents are used from the outset;

the film can be produced economically. This also means, for example, that stretching processes which are customary in industry can be used to produce the film; in addition, it should be possible to produce the film at machine speeds of up to 500 m/min which are customary today;

good adhesion (preferably greater than 2 N/15 mm of film width) between the individual layers of the film is ensured for their practical employment;

the optical properties of the film are good. This means, for example, low opacity in the case of a transparent film (preferably <20%) and high gloss (preferably >70 for the sealable side and preferably >100 for the side opposite the sealable side; each measured at angle of incidence 20°) of the film;

in the course of the production of the film, it is guaranteed that the regrind can be fed back to the extrusion in an amount of up to approx. 60% by weight, without significantly adversely affecting the physical (the tensile strain at break of the film in both directions should not decrease by more than 10%), but in particular the optical, properties of the film;

the non-sealable side of the film has been rendered adhesion-promoting.

In addition, care should be taken that the film can be processed on high-speed machines. On the other hand, the known properties which distinguish polyester films should at the same time not deteriorate. These include, for example, the good mechanical (the modulus of elasticity of the biaxially stretched films in both orientation directions should be greater than 3500 N/mm², preferably greater than 3800 N/mm² and more preferably greater than 4200 N/mm²) and the thermal properties (the shrinkage of the biaxially stretched films in both orientation directions should not be greater than 3%, preferably not greater than 2.8% and more preferably not greater than 2.5%), the winding performance and the processibility of the film, in particular in the printing, laminating or in the coating of the film with metallic or ceramic materials.

Heatsealable refers here to the property of a multilayer polyester film which has at least one base layer (B) and has at least one outer layer (=heatsealable outer layer) which can be bonded by means of sealing jaws by applying heat (140 to 220° C.) and pressure (2 to 5 bar) within a certain time (0.2 to 2 s) to itself (fin sealing), or to a substrate made of a thermoplastic (=lap sealing, here in particular to CPET or the APET side of APET/CPET trays), without the carrier layer (=base layer) itself becoming plastic. In order to achieve this, the polymer of the sealing layer generally has a distinctly lower melting point than the polymer of the base layer. When the polymer used for the base layer is, for example, PET having a melting point of 254° C., the melting point of the heatsealable layer is generally less than 230° C., in the present case preferably less than 210° C. and more preferably less than 190° C.

Peelable refers here to the property of the inventive polyester film which comprises at least one layer (=heatsealable and peelable outer layer (A)), after heatsealing to a substrate (here essentially to CPET or the APET side of an APET/CPET tray), of being able to be removed from the substrate again in such a way that the film neither starts to tear nor tears off. The bond of heatsealable film and substrate breaks in the seam between the heatsealed layer and substrate surface when the film is removed from the substrate (cf. also Ahlhaus, O. E.: Verpackung mit Kunststoffen [Packaging with plastics], Carl Hanser Verlag, p. 271, 1997, ISBN 3-446-17711-6). When the film heatsealed to a test strip of the substrate is removed in a tensile strain testing instrument at a peeling angle of 180° in accordance with FIG. 2, the tensile strain behavior of the film according to FIG. 3b is then obtained. On commencement of the peeling of the film from the substrate, the force required for this purpose rises, according to FIG. 3b, up to a certain value (e.g. 4 N/15 mm) and then remains approximately constant over the entire peeling operation, but is subject to larger or smaller variations (approx. ±20%).

DETAILED DESCRIPTION OF THE INVENTION

Figure 1:
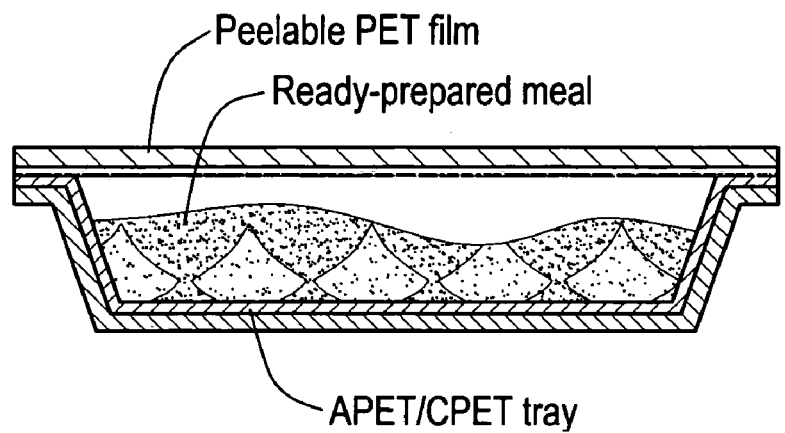
FIG. 1 is a schematic illustration of an exemplary sealed tray.

The object is achieved by the provision of a coextruded, transparent, biaxially oriented polyester film which has a base layer (B) and has a heatsealable outer layer (A) that can be peeled at least from polyester (APET and/or CPET), where the outer layer (A)

a) is composed of from 60 to 99% by weight of polyester which is composed of from 12 to 89 mol % of units derived from at least one aromatic dicarboxylic acid and of from 11 to 88 mol % of units derived from at least one aliphatic dicarboxylic acid, where the total of the dicarboxylic-acid-derived molar percentages is 100, and b) comprises particles in a concentration of from 1 to 10% by weight which have a median diameter $d_{50}$ of from 2.0 to 8.0 μm (based in each case on the mass of the outer layer (A)), and where the non-sealable surface of the film has been rendered adhesion-promoting.

The thickness of the outer layer (A) $d_A$ is preferably from 1.0 to 7.0 μm (measured on the biaxially oriented polyester film).

The abovementioned parameters are in each case to be regarded as preferred values.

The material of the outer layer (A) or of the outer layer film (A) thus includes predominantly a polyester. The polyester is composed of units which are derived from aromatic and aliphatic dicarboxylic acids. The units which derive from the aromatic dicarboxylic acids are present in the polyester in an amount of preferably from 12 to 89 mol %, in particular from 30 to 84 mol %, more preferably from 40 to 82 mol %. The units which derive from the aliphatic dicarboxylic acids are present in the polyester in an amount of from 11 to 88 mol %, preferably from 16 to 70 mol %, more preferably from 18 to 60 mol %, and the molar percentages always add up to 100%. The diol units corresponding thereto likewise always make up 100 mol %.

Preferred aliphatic dicarboxylic acids are succinic acid, pimelic acid, suberic acid, azelaic acid, sebacic acid, glutaric acid, and adipic acid. Especially preferred are azelaic acid, sebacic acid and adipic acid.

Preferred aromatic dicarboxylic acids are terephthalic acid, isophthalic acid, and 2,6-naphthalenedicarboxylic acid, in particular terephthalic acid and isophthalic acid.

Preferred diols are ethylene glycol, butylene glycol and neopentyl glycol.

In general, the polyester comprises the following dicarboxylates and alkylenes, based in each case on the total amount of dicarboxylate or total amount of alkylene:

from 12 to 89 mol %, preferably from 25 to 79 mol % and more preferably from 30 to 72 mol %, of terephthalate;

from 0 to 25 mol %, preferably from 5 to 20 mol % and more preferably from 10 to 20 mol %, of isophthalate;

from 11 to 88 mol %, preferably from 16 to 70 mol % and more preferably from 17 to 58 mol %, of azelate;

from 0 to 50 mol %, preferably from 0 to 40 mol % and more preferably from 0.2 to 30 mol %, of sebacate;

from 0 to 50 mol %, preferably from 0 to 40 mol % and more preferably from 0 to 30 mol %, of adipate;

more than 30 mol %, preferably more than 40 mol % and more preferably more than 50 mol %, of ethylene or butylene.

In addition, the material of the outer layer (A) may contain up to 10% by weight of further additives, auxiliaries and/or other additives which are customarily used in polyester film technology.

In a favorable embodiment, the material of the outer layer (A) additionally contains from 2 to 30% by weight, preferably from 5 to 25% by weight and more preferably from 7 to 20% by weight, of a polymer which is incompatible with polyester (anti-PET polymer).

It has been found to be appropriate to produce the main polyester of the outer layer (A) from two separate polyesters I and II which are fed to the extruder(s) for the formation of this layer (film) as a mixture.

Figure 2:
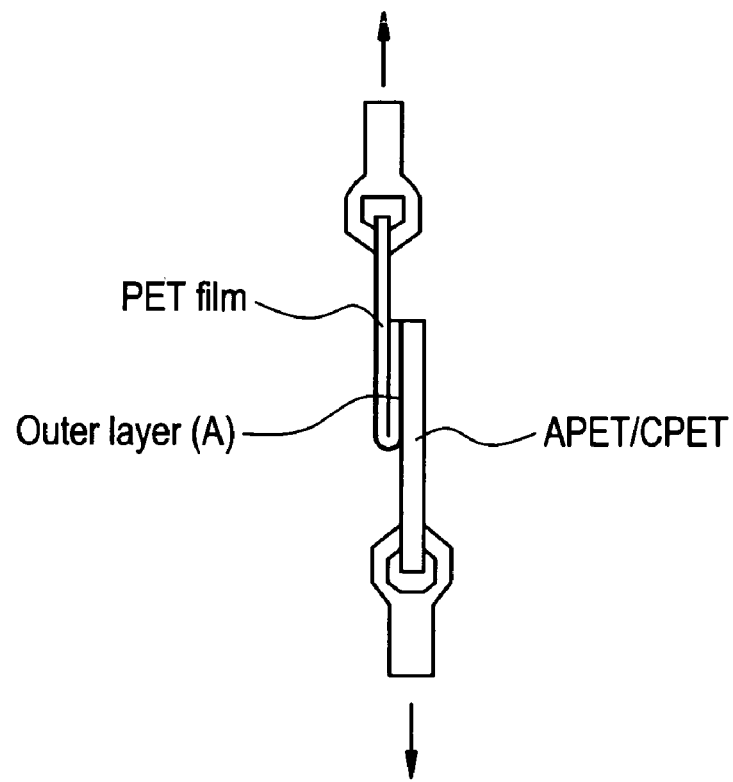
FIG. 2 is a schematic illustration of a tensile strain measuring technique.
Figure 3A:
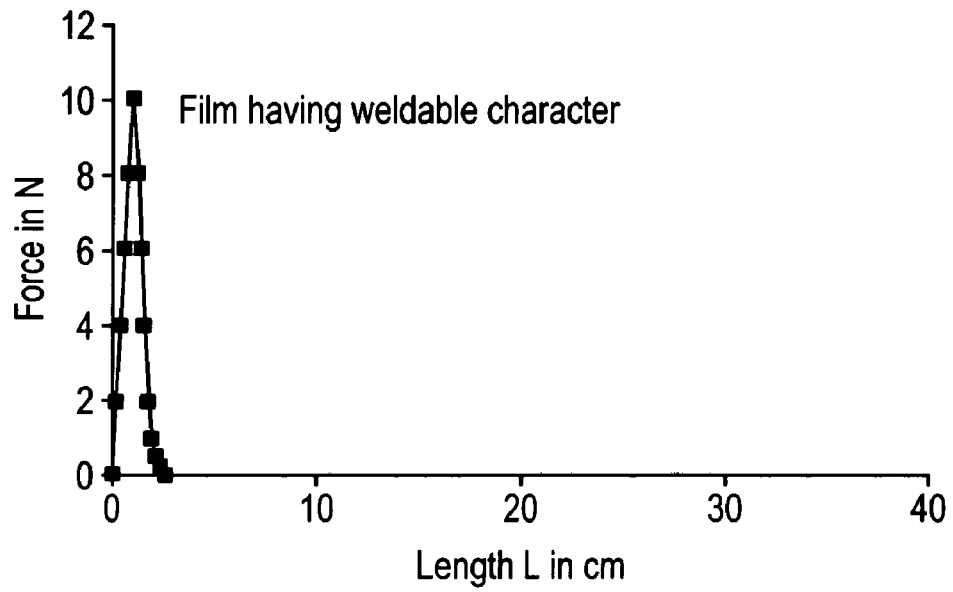
FIG. 3a is an exemplary diagram of tensile strain at break for a film having weldable behavior.
Figure 3B:
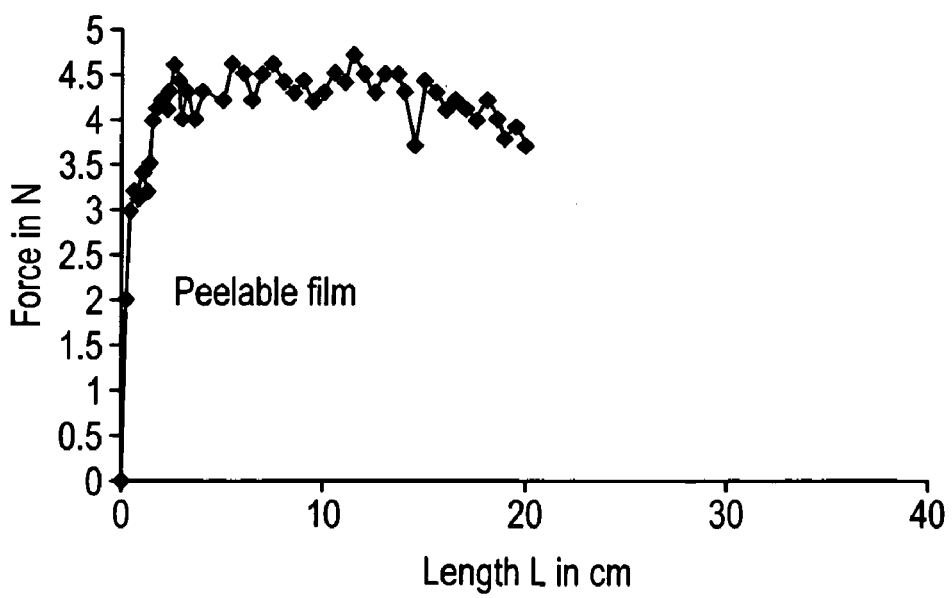
FIG. 3b is an exemplary diagram of tensile strain at break for a film having peelable behavior.
Figure 4:
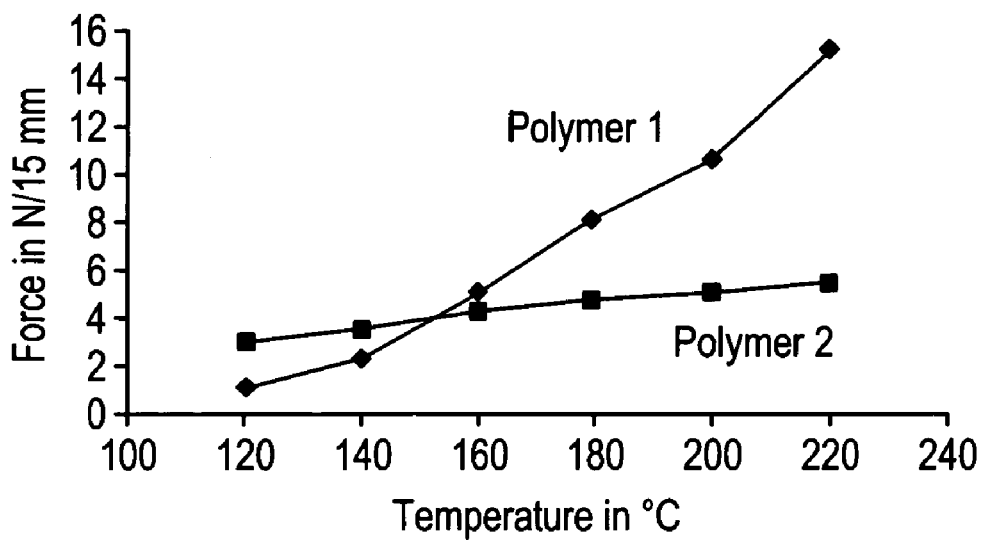
FIG. 4 is an exemplary diagram of tensile strain at break for films having weldable and peelable behavior.

The heatsealable and peelable outer layer (A) is distinguished by characteristic features. It has a sealing commencement temperature (=minimum sealing temperature) with respect to CPET or the APET side of APET/CPET trays of not more than 165° C., preferably not more than 155° C. and more preferably not more than 150° C., and a seal seam strength with respect to CPET or the APET side of APET/CPET trays of preferably at least 1.5 N, in particular at least 2.0 N, more preferably at least 2.5 N (always based on 15 mm film width). The heatsealable and peelable outer layer (A), with respect to CPET or the APET side of APET/CPET trays, has a maximum sealing temperature of generally 220° C., preferably 200° C. and more preferably 190° C., and a film which is peelable with respect to CPET or the APET side of APET/CPET trays is obtained within the entire sealing range. In other words, this film in the 180° tensile experiment according to FIG. 2 provides a curve according to FIG. 3b. The term trays can be equated with materials in general.

For the preferred, abovementioned ranges, the peeling results can also be described numerically. According to the present experimental investigations, the peeling results can be correlated to one another simply by the following relationship between the sealing temperature (T=δ in ° C.) and the peeling force (in N/15 mm)

Figure 5:
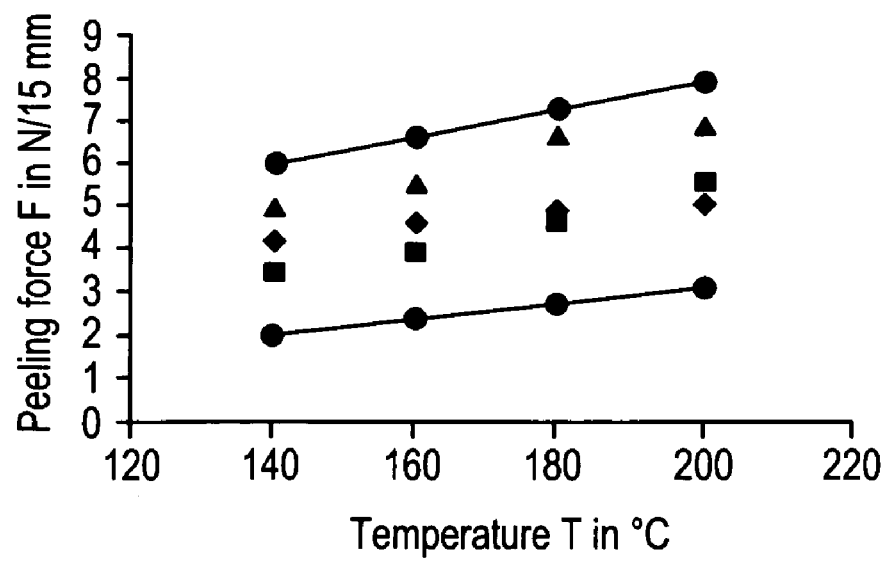
FIG. 5 is an exemplary diagram of the correlation between sealing temperature and peeling force.

$0.02 \cdot \delta /° C. -0.8 \leq$ peeling force $F/N$ per 15 mm $\leq 0.033 \cdot \delta /° C. +1.4$ This relationship is depicted graphically in FIG. 5 for illustration.

The film of the present invention has a base layer (B) and at least one inventive outer layer (A). In this case, the film has a two-layer structure. In a preferred embodiment, the film has a three- or more than three-layer structure. In the case of the particularly preferred three-layer embodiment, it includes the base layer (B), the inventive outer layer (A) and a outer layer (C) on the opposite side to the outer layer (A); A-B-C film structure. In a four-layer embodiment, the film comprises an intermediate layer (D) between the base layer (B) and the outer layer (A) or (C).

The base layer of the film includes at least 80% by weight of thermoplastic polyester, based on the weight of the base layer (B). Suitable for this purpose are, for example, polyesters of ethylene glycol and terephthalic acid (=polyethylene terephthalate, PET), of ethylene glycol and naphthalene-2,6-dicarboxylic acid (=poly-ethylene 2,6-naphthalate, PEN), of 1,4-bishydroxymethyl-cyclohexane and terephthalic acid (=poly-1,4-cyclo-hexanedimethylene terephthalate, PCDT) and also of ethylene glycol, naphthalene-2,6-dicarboxylic acid and biphenyl-4,4'-dicarboxylic acid (=polyethylene 2,6-naphthalate bibenzoate, PENBB). Preference is given to polyesters which contain ethylene units and include, based on the dicarboxylate units, at least 90 mol %, more preferably at least 95 mol %, terephthalate or 2,6-naphthalate units. The remaining monomer units stem from other dicarboxylic acids or diols. Advantageously, copolymers or mixtures or blends of the homo- and/or copolymers mentioned can also be used for the base layer (B). In the specification of the amounts of the dicarboxylic acids, the total amount of all dicarboxylic acids is 100 mol %. Similarly, the total amount of all diols also adds up to 100 mol %.

Suitable other aromatic dicarboxylic acids are preferably benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, and the alkane moiety may be straight-chain or branched.

Suitable other aliphatic diols are, for example, diethylene glycol, triethylene glycol, aliphatic glycols of the general formula $HO-(CH_2)_n-OH$ where n is an integer from 3 to 6 (in particular propane-1,3-diol, butane-1,4-diol, pentane-1,5-diol and hexane-1,6-diol) or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula $HO-C_6H_4-X-C_6H_4-OH$ where X is $-CH_2-$, $-C(CH_3)_2-$, $-C(CF_3)_2-$, $-O-$, $-S-$ or $-SO_2-$. In addition, bisphenols of the formula $HO-C_6H_4-C_6H_4-OH$ are also very suitable.

It is particularly advantageous when a polyester copolymer based on terephthalate and small amounts (preferably <5 mol %) of isophthalic acid or based on terephthalate and small amounts (preferably <5 mol %) of naphthalene-2,6-dicarboxylic acid is used in the base layer (B). In this case, the producibility of the film and the optical properties of the film are particularly good. The base layer (B) then comprises substantially a polyester copolymer which is composed predominantly of terephthalic acid and isophthalic acid units and/or terephthalic acid and naphthalene-2,6-dicarboxylic acid units and of ethylene glycol units. The particularly preferred copolyesters which provide the desired properties of the film are those which are composed of terephthalate and isophthalate units and of ethylene glycol units.

The polyesters can be prepared, for example, by the transesterification process. In this process, the starting materials are dicarboxylic esters and diols which are reacted with the customary transesterification catalysts such as salts of zinc, calcium, lithium and manganese. The intermediates are then polycondensed in the presence of generally customary polycondensation catalysts such as antimony trioxide, titanium oxides or esters, or else germanium compounds. The preparation may equally be by the direct esterification process in the presence of polycondensation catalysts. This process starts directly from the dicarboxylic acids and the diols.

The film of the present invention has an at least two-layer structure. In that case, it includes the base layer (B) and the inventive sealable and peelable outer layer (A) applied to it by coextrusion.

The sealable and peelable outer layer film (A) preferably applied to the base layer (B) by coextrusion is composed predominantly, i.e. preferably to an extent of at least 60% by weight, of polyesters.

According to the invention, the heatsealable and peelable outer layer (A) comprises polyesters based on aromatic and aliphatic acids and preferably aliphatic diols.

In the preferred embodiment, polyesters are copolyesters or blends of homo- and copolyesters or blends of different copolyesters which are formed on the basis of aromatic and aliphatic dicarboxylic acids and aliphatic diols.

Examples of the aromatic dicarboxylic acids which can be used in accordance with the invention are terephthalic acid, isophthalic acid, phthalic acid and naphthalene-2,6-dicarboxylic acid.

Examples of the aliphatic dicarboxylic acids which can be used in accordance with the invention are succinic acid, glutaric acid, adipic acid, pimelic acid, suberic acid, azelaic acid and sebacic acid.

Examples of the aliphatic diols which can be used in accordance with the invention are ethylene glycol, 1,3-propanediol, 1,3-butanediol, 1,4-butanediol, 1,5-pentane-diol, 2,2-dimethyl-1,3-propanediol, diethylene glycol, triethylene glycol and 1,4-cyclohexanedimethanol.

The polyester for the outer layer (A) is preferably prepared from two polyesters I and II.

The proportion of the polyester I which includes one or more aromatic dicarboxylates and one or more aliphatic alkylenes in the outer layer (A) is preferably from 0 to 50% by weight. In the preferred embodiment, the proportion of the polyester I is from 5 to 45% by weight, and in the particularly preferred embodiment it is from 10 to 40% by weight.

In general, the polyester I of the inventive outer layer (A) is based on the following dicarboxylates and alkylenes, based in each case on the total amount of dicarboxylate or total amount of alkylene:

from 70 to 100 mol %, preferably from 72 to 95 mol % and more preferably from 74 to 93 mol %, of terephthalate;

from 0 to 30 mol %, preferably from 5 to 28 mol % and more preferably from 7 to 26 mol %, of isophthalate;

more than 50 mol %, preferably more than 65 mol % and more preferably more than 80 mol %, of ethylene units.

Any remaining fractions present stem from other aromatic dicarboxylic acids and other aliphatic diols, as have already been listed above for the base layer (B).

Very particular preference is given to those copolyesters in which the proportion of terephthalate units is from 74 to 88 mol %, the corresponding proportion of isophthalate units is from 12 to 26 mol % (the dicarboxylate fractions adding up to 100 mol %) and the proportion of ethylene units is 100 mol %. In other words, they are polyethylene terephthalate/isophthalate.

In a further preferred embodiment, the polyester I includes a mixture which comprises a copolyester composed of terephthalate units, isophthalate units and ethylene units, and an aromatic polyester homopolymer, e.g. a polybutylene terephthalate.

According to the present invention, the proportion of polyester II in the outer layer (A) is from 50 to 100% by weight. In the preferred embodiment the proportion of polyester II is from 55 to 95% by weight and in the particularly preferred embodiment it is from 60 to 90% by weight.

The polyester II preferably includes a copolymer of aliphatic and aromatic acid components, in which the aliphatic acid components are preferably from 20 to 90 mol %, in particular from 30 to 70 mol % and more preferably from 35 to 60 mol %, based on the total acid amount of the polyester II. The remaining dicarboxylate content up to 100 mol % stems from aromatic acids, preferably terephthalic acid and/or isophthalic acid, and also, among the glycols, from aliphatic or cycloaliphatic or aromatic diols, as have already been described in detail above with regard to the base layer.

In general, the polyester II of the inventive outer layer (A) is preferably based at least on the following dicarboxylates and alkylenes, based in each case on the total amount of dicarboxylate or the total amount of alkylene:

from 20 to 90 mol %, preferably from 30 to 65 mol % and more preferably from 35 to 60 mol %, of azelate;

from 0 to 50 mol %, preferably from 0 to 45 mol % and more preferably from 0 to 40 mol %, of sebacate;

from 0 to 50 mol %, preferably from 0 to 45 mol % and more preferably from 0 to 40 mol %, of adipate;

from 10 to 80 mol %, preferably from 20 to 70 mol % and more preferably from 30 to 60 mol %, of terephthalate;

from 0 to 30 mol %, preferably from 3 to 25 mol % and more preferably from 5 to 20 mol %, of isophthalate;

more than 30 mol %, preferably more than 40 mol % and more preferably more than 50 mol %, of ethylene or butylene.

Any remaining fractions present stem from other aromatic dicarboxylic acids and other aliphatic diols, as have already been listed above for the base layer (B), or else from hydroxycarboxylic acids such as hydroxybenzoic acid or the like.

The presence of preferably at least 10 mol % of aromatic dicarboxylic acid ensures that the polymer II can be processed without adhesion, for example in the intake region of the extruder for the outer layer (A).

The outer layer (A) preferably comprises a mixture of the polyesters I and II. Compared to the use of only one polyester with comparable components and comparable proportions of the components, a mixture has the following advantages:

The mixture of the two polyesters I and II, from the aspect of the particular glass transition temperatures ($T_g$S), is easier to process (to extrude). As investigations have shown, the mixture of a polymer having a high $T_g$ (polyester I) and a polymer having a low $T_g$ (polyester II) has a lesser tendency to adhere in the coextruder than a single polymer having a correspondingly mixed $T_g$. The polymer production is simpler, because the number of metering stations available for the starting materials is generally not unlimited. Moreover, from a practical aspect, the desired peeling properties can be adjusted more individually with the mixture than when a single polyester is used. The addition of particles (see below) is also simpler in the case of polyester I than in the case of polyester II.

Appropriately, the glass transition temperature of polyester I is more than 50° C. The glass transition temperature of polyester I is preferably more than 55° C. and more preferably more than 60° C. When the glass transition temperature of polyester I is less than 50° C., the film in some circumstances cannot be produced in a reliable process. The tendency of the film (A) to adhere, for example to the metallic walls of the extruder, may be so high that blockages in the extruder have to be expected.

Appropriately, the glass transition temperature of polyester II is less than 20° C. The glass transition temperature is preferably less than 15° C. and more preferably less than 10° C. When the glass transition temperature of polyester II is greater than 20° C., the film has an increased tendency to start to tear or tear off when pulled off the tray, which is undesired.

In a further appropriate embodiment of the invention, the heatsealable and peelable outer layer (A) comprises a polymer which is incompatible with polyester (anti-PET polymer). In that case, the proportion of the polyester-incompatible polymer (anti-PET polymer) is preferably from 2 to 30% by weight, based on the mass of the outer layer (A). In a preferred embodiment, the proportion of the polymer is from 5 to 25% by weight and in the particularly preferred embodiment it is from 7 to 20% by weight, likewise based on the mass of the outer layer (A).

Examples of suitable incompatible polymers (anti-PET polymers) are polymers based on ethylene (e.g. LLDPE, HDPE), propylene (PP), cycloolefins (CO), amides (PA) or styrene (PS). In a preferred embodiment, the polyester-incompatible polymer (anti-PET polymer) used is a copolymer. Examples thereof are copolymers based on ethylene (C2/C3, C2/C3/C4 copolymers), propylene (C2/C3, C2/C3/C4 copolymers), butylene (C2/C3, C2/C3/C4 copolymers) or based on cycloolefins (norbornene/ethylene, tetracyclododecene/ethylene copolymers). In one of the particularly preferred embodiments, the polyester-incompatible polymer (anti-PET polymer) is a cycloolefin copolymer (COC). Such cycloolefin copolymers are described, for example, in EP-A 1 068 949 or in JP 05-009319, which are incorporated herein by reference.

Among the cycloolefin copolymers, preference is given in particular to those which comprise polymerized units of polycyclic olefins having a norbornene basic structure, more preferably norbornene or tetracyclododecene. Particular preference is given to cycloolefin copolymers (COC) which contain polymerized units of acyclic olefins, in particular ethylene. Very particular preference is given to norbornene/ethylene and tetracyclododecene/ethylene copolymers which contain from 5 to 80% by weight of ethylene units, preferably from 10 to 60% by weight of ethylene units (based on the mass of the copolymer).

The cycloolefin polymers generally have glass transition temperatures between −20 and 400° C. For the invention, particularly suitable cycloolefin copolymers (COC) are those which have a glass transition temperature of less than 160° C., preferably less than 120° C. and more preferably less than 80° C. The glass transition temperature should preferably be above 50° C., preferably above 55° C. and in particular above 60° C. The viscosity number (decalin, 135° C., DIN 53 728) is appropriately between 0.1 and 200 ml/g, preferably between 50 and 150 ml/g. Films which comprise a COC having a glass transition temperature of less than 80° C. compared to those which comprise a COC having a glass transition temperature of greater than 80° C., feature improved optical properties, especially low opacity.

The cycloolefin copolymers (COC) are prepared, for example, by heterogeneous or homogeneous catalysis with organometallic compounds and their preparation is described in a multitude of documents. Suitable catalyst systems based on mixed catalysts of titanium or vanadium compounds in combination with aluminum organyls are described in DD 109 224, DD 237 070 and EP-A-0 156 464.

EP-A-0 283 164, EP-A-0 407 870, EP-A-0 485 893 and EP-A-0 503 422 describe the preparation of cycloolefin copolymers (COC) with catalysts based on soluble metallocene complexes. Particular preference is given to using cycloolefin copolymers prepared with catalysts which are based on soluble metallocene complexes. Such COCs are commercially obtainable; for example TOPAS® (Ticona, Frankfurt).

When the proportion of the polyester-incompatible polymer (anti-PET polymer) is less than 2% by weight, based on the weight of the outer layer (A), there is under some circumstances no positive influence of the polymer on the removal performance of the film from the tray. When the film is removed from the tray, it still tends to start to tear or to tear off. Especially at relatively high sealing temperatures (>160° C.), this effect as a result of the addition of polyester-incompatible polymer (anti-PET polymer) becomes particularly apparent. Even in that case, films produced in accordance with the invention do not start to tear or tear off on removal from the tray. On the other hand, the proportion of polyester-incompatible polymer (anti-PET polymer) should not exceed 30% by weight, since the opacity of the film otherwise becomes too high.

To improve the handling of the film, the processibility of the film, but in particular also to improve the removal performance of the film from the tray, it is advantageous to further modify the heatsealable and peelable outer layer (A).

This is at best done with the aid of suitable particles (antiblocking agents) which are added to the sealing layer and in such amounts that the removal performance of the film from the tray is further improved, blocking of the film is prevented and the processing performance of the film is optimized.

It has been found to be advantageous for at least the outer layer (A) to comprise particles in a certain size, in a certain concentration and in a certain distribution. In addition, mixtures of two and more different particle systems or mixtures of particle systems in the same chemical composition, but different particle size, can also be added to the outer layer (A).

Customary particles (also referred to as "pigments" or "antiblocking agents") are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, or calcium, barium, zinc or manganese salts of the dicarboxylic acids used, carbon black, titanium dioxide, kaolin or crosslinked polystyrene or acrylate particles. The particles can be added to the layer in the particular advantageous concentrations, for example as a glycolic dispersion during the polycondensation or via masterbatches in the course of extrusion.

Particles which are preferred in accordance with the invention are synthetic, amorphous $SiO_2$ particles in colloidal form. These particles are bound into the polymer matrix in an outstanding manner and generate only a few vacuoles (cavities). Vacuoles form at the particles in the course of the biaxial orientation, generally cause opacity and are therefore ill-suited to the present invention. To (synthetically) produce the $SiO_2$ particles (also known as silica gel), sulfuric acid and sodium silicate are initially mixed together under controlled conditions to form hydrosol. This eventually forms a hard, transparent mass which is known as a hydrogel. After separation of the sodium sulfate formed as a by-product by a washing process, the hydrogel can be dried and further processed. Control of the washing water pH and the drying conditions can be used to vary the important physical parameters, for example pore volume, pore size and the size of the surface of the resulting silica gel. The desired particle size (for example the $d_{50}$ value) and the desired particle size distribution (for example the SPAN98) are obtained by suitable grinding of the silica gel (for example mechanically or hydro-mechanically). Such particles can be obtained, for example, via Grace, Fuji, Degussa or Ineos.

It has been found to be particularly advantageous to use particles having an average particle diameter $d_{50}$ of from 2.0 to 8 μm, preferably from 2.5 to 7 μm and more preferably from 3.0 to 6 μm. When particles having a diameter which is below 2.0 μm are used, there is under some circumstances no positive influence of the particles on the removal performance of the film from the tray. In this case, the film again tends to start to tear or continue to tear on removal from the tray, which is of course undesired. Particles having a diameter greater than 8 μm generally cause filter problems.

In a further preferred embodiment, the diameter $d_{50}$ of the particles in the outer layer (A) is greater than the thickness of this layer. It has been found to be advantageous to select a diameter/layer thickness ratio of preferably at least 1.1, in particular at least 1.3 and more preferably at least 1.5. In these cases, there is a particularly positive influence of the particles on the removal performance of the film from the tray.

To provide the desired peeling properties, it has been found to be particularly advantageous when the heat-sealable and peelable outer layer (A) comprises particles in a concentration of from 1.0 to 10% by weight. The concentration of the particles is preferably from 2.5 to 10.0% by weight and more preferably from 4.0 to 10.0% by weight. In contrast, when the outer layer (A) of the film comprises particles in a concentration of less than 1.0% by weight, there is under some circumstances no longer any positive influence on the removal performance of the film from the tray. In contrast, when the outer layer (A) of the film comprises particles in a concentration of more than 10% by weight, the opacity of the film becomes too high.

It has been found to be particularly advantageous to use particles in the heatsealable and peelable outer layer (A) whose particle diameter distribution has a degree of scatter which is described by a SPAN98 of $\leq 2.0$ (for definition of SPAN98, see test method). Preference is given to a SPAN98 of $\leq 1.9$ and particular preference to a SPAN98 of $\leq 1.8$. In contrast, when the outer layer (A) of the film comprises particles whose SPAN98 is greater than 2.0, the optical properties and the sealing properties of the film deteriorate.

Moreover, it has been found to be advantageous to set the roughness of the heatsealable and peelable outer layer (A) in such a way that its $R_a$ value is preferably greater than 60 nm. Preference is given to the roughness $R_a$ being greater than 80 nm and it is more preferably greater than 100 nm; the upper limit of the roughness should not exceed 400 nm, preferably 350 nm, in particular 300 nm. This can be controlled via the selection of the particle diameters, their concentration and the variation of the layer thickness.

In order to further improve the processing performance of the film of the present invention, it is advantageous likewise to incorporate particles into the base layer (B) in the case of a two-layer film structure (AB), or into the non-sealable outer layer (C) in the case of a three-layer film structure (ABC), in which case the following conditions should preferably be observed:

a) The particles should have an average particle diameter $d_{50}$ (=median) of from 1.5 to 6 μm. It has been found to be particularly appropriate to use particles having an average particle diameter $d_{50}$ of from 2.0 to 5 μm and more preferably from 2.5 to 4 μm.

b) The particles should be present in a concentration of from 0.1 to 1.0% by weight. The concentration of the particles is preferably from 0.12 to 1.0% by weight and more preferably from 0.15 to 1.0% by weight.

To achieve the aforementioned properties, in particular the optical properties of the sealable and peelable film, it has been found to be appropriate, in particular in the case of a three-layer film having ABC structure, to set the amount of particles in the base layer (B) at a lower level than in outer layer (A). In the three-layer film of the type mentioned, the amount of particles in the base layer (B) should appropriately be between 0 and 2.0% by weight, preferably between 0 and 1.5% by weight, in particular between 0 and 1.0% by weight. It has been found to be particularly appropriate only to incorporate those particles into the base layer which get into the film via the same type of regrind (recyclate). The optical properties of the film, in particular the opacity of the film, are then particularly good.

According to the invention, at least one film surface has been treated in such a way that the contact angle with respect to water is preferably $\leq 64°$, in particular $\leq 62°$, more preferably $\leq 60°$.

This is preferably achieved by a corona or flame treatment which typically follows the heat-setting of the film. Equally, the treatment may be effected at other points in the film production process, for example before or after the longitudinal stretching. Alternatively or in addition to the above-described surface treatment, the film may be coated on the non-sealable surface with a functional coating, so that the coating on the finished film has a thickness of preferably from 5 to 2000 nm, preferably from 20 to 500 nm, in particular from 30 to 200 nm. The coating is preferably applied inline, i.e. during the film production process, appropriately before the transverse stretching. Particular preference is given to application by means of the "reverse gravure-roll coating" process, in which the coating can be applied highly homogeneously in layer thicknesses up to 100 nm. Likewise preferred is application by the Meyer rod process, by which larger coating thicknesses can be achieved. The coatings are applied preferably as solutions, suspensions or dispersions, more preferably as an aqueous solution, suspension or dispersion.

The coatings mentioned impart to the film surface an additional function; for example, this makes the film sealable, printable, metallizable, sterilizable, antistatic, or they improve, for example, the aroma barrier or enable adhesion to materials which would otherwise not adhere to the film surface.

Examples of substances/compositions which impart the additional functionality are: acrylates, as described, for example, in WO 94/13476, ethylvinyl alcohols, PVDC, waterglass ($Na_2SiO_4$), hydrophilic polyesters (5-Na-sulfoisophthalic acid-containing PET/IPA polyesters, as described, for example, in EP-A-0144878, U.S. Pat. No. 4,252,885 or EP-A-0296620), polyvinyl acetates, as described, for example, in WO 94/13481, polyurethanes, alkali metal or alkaline earth metal salts of $C_{10}$-$C_{18}$ fatty acids, butadiene copolymers with acrylonitrile or methyl methacrylate, methacrylic acid or esters thereof.

The substances/compositions mentioned are applied to one or both film surfaces, for example, as a dilute solution, emulsion or dispersion, preferably as an aqueous solution, emulsion or dispersion, and the solvent is subsequently volatilized. When the coatings are applied inline before the transverse stretching, the heat treatment in the transverse stretching is usually sufficient to volatilize the solvent and to dry the coating. The dried coatings then have coating thicknesses of from 5 to 2000 nm, preferably from 20 to 500 nm, in particular from 30 to 200 nm.

In a preferred embodiment of the invention, a copolyester coating is used to achieve better adhesion. The preferred coating copolyesters are prepared by polycondensing a) isophthalic acid, b) an aliphatic dicarboxylic acid of the formula

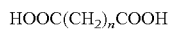

where n is in the range from 1 to 11, c) a sulfomonomer containing an alkali metal sulfonate group on the aromatic moiety of an aromatic dicarboxylic acid and d) at least one aliphatic or cycloaliphatic alkylene glycol having from about 2 to 11, preferably from 2 to 8, more preferably from 2 to 6, carbon atoms. The total number of acid equivalents present should correspond, on a molar basis substantially to the total number of glycol equivalents present.

It has been found that the relative proportions of components a) to d) which are used to prepare the preferred copolyester coatings are important for the achievement of a coated film with satisfactory adhesion. For example, isophthalic acid (component a) should preferably be present as the acid component to an extent of at least about 65 mol %. Component a) is preferably pure isophthalic acid which is present in an amount of from about 70 to 95 mol %. For component b), it is the case that each acid having the formula specified brings satisfactory results, and preference is given to adipic acid, azelaic acid, sebacic acid, malonic acid, succinic acid, glutaric acid or mixtures of these acids. The desired amount within the range specified is preferably from 1 to 20 mol %, based on the acid components of the copolyester when component b) is present in the composition. The monomer forming component c) of the preferred copolyester composition should preferably be present in this system in an amount of at least 5 mol %, so that the primer is dispersible with water. The amount of monomer of component c) is more preferably from about 6.5 to 12 mol %. The glycol component d) is present in an approximately stoichiometric amount.

In a further preferred embodiment of the invention, an acrylate coating is used to achieve better adhesion. The acrylic copolymers used with preference include essentially at least 50% by weight of one or more polymerized acrylic and/or methacrylic monomers and from 1 to 15% by weight of a copolymerizable comonomer which is capable of forming intermolecular crosslinks in the copolymerized state under the action of elevated temperature, if appropriate without addition of a special resinous crosslinking agent.

The acrylic component of the adhesion promoter copolymers is present preferably in an amount of from 50 to 99% by weight and includes preferably an ester of methacrylic acid, in particular an alkyl ester whose alkyl group contains up to ten carbon atoms, for example the methyl, ethyl, n-propyl, isopropyl, n-butyl, isobutyl, tertiary butyl, hexyl, 2-ethylhexyl, heptyl and n-octyl group. Acrylic copolymers which are derived from a lower alkyl acrylate (C1 to C4), especially ethyl acrylate, together with a lower alkyl methacrylate, result in particularly good adhesion between the polyester film and reprographic coatings and matt coatings applied thereto. Very particular preference is given to using adhesion promoter copolymers composed of an alkyl acrylate, e.g. ethyl acrylate or butyl acrylate, together with an alkyl methacrylate, e.g. methyl methacrylate, especially in equal molar parts and in a total amount of from 70 to 95% by weight. The acrylate comonomer of such acrylic/methacrylic combinations is present preferably in a proportion of from 15 to 65 mol % and the methacrylate comonomer preferably in a proportion which is generally from 5 to 20 mol % greater than the proportion of the acrylate comonomer. The methacrylate is preferably present in the combination in a proportion of from 35 to 85 mol %.

To increase the solvent resistance, comonomers suitable for forming crosslinks may be used, for example N-methylolacrylamide, N-methylolmethacrylamide and the corresponding ethers; epoxy materials, for example glycidyl acrylate, glycidyl methacrylate and allyl glycidyl ether; monomers containing carboxyl groups, for example crotonic acid, itaconic acid or acrylic acid; anhydrides, for example maleic anhydride or itaconic anhydride; monomers containing hydroxyl groups, for example allyl alcohol and hydroxyethyl or hydroxypropyl acrylate or methacrylate; amides, for example acrylamide, methacrylamide or maleimide and isocyanates, for example vinyl isocyanate or allyl isocyanate. Of the above-mentioned crosslinking comonomers, preference is given to N-methylolacrylamide and N-methylolmethacrylamide, primarily because copolymer chains which contain one of these monomers are capable of condensation with one another under the action of elevated temperatures and thus of forming the desired intermolecular crosslinks. However, the solvent resistance, desired in some cases, of the preferred acrylate coating may also be achieved by the presence of an extraneous crosslinking agent, for example of a melamine- of urea-formaldehyde condensate. When there is no need for solvent resistance, it is possible to dispense with crosslinking agents.

The preferred acrylate coating may be applied to one or both sides of the film. It is also possible only to provide one side of the film with the inventive coating and to apply another coating to the other side. The coating formulation may contain known additives, for example antistats, wetting agents, surfactants, pH regulators, antioxidants, dyes, pigments, antiblocking agents, for example colloidal $SiO_2$, etc. It is normally appropriate to incorporate a surfactant in order to increase the capacity of the aqueous coating to wet the carrier film made of polyester.

In a further preferred embodiment of the invention, a water-soluble or hydrophilic coating is used to achieve better adhesion to hydrophilic layers or printing inks. The preferred hydrophilic coating may in particular be achieved in three ways:

1. a mixture of an aromatic copolyester (I-1) having a functional group dispersible in water and a polyvinyl alcohol (II-1);
2. a mixture of an aromatic copolyester (I-2) having a functional group dispersible in water and a polyglycerol polyglycidyl ether (II-2); or
3. a mixture of an aqueous polyurethane (I-3) and a polyvinyl alcohol (II-3).

The aromatic copolyesters (I-1 and I-2) are prepared from aromatic dicarboxylic acids, for example terephthalic acid, naphthalene-2,6-dicarboxylic acid or isophthalic acid, optionally crosslinked or condensed aliphatic diols, for example ethylene glycol, diethylene glycol, 2-methylpropanol or 2,2-dimethylpropanol, and an ester-forming compound which bears a functional group dispersible in water. Examples of the functional groups are: hydroxyl, carboxyl, sulfonic acid or phosphoric acid groups or salts thereof. Preference is given to sulfonic acid and carboxylic acid salts. The polyvinyl alcohol component (II-1 and II-3) used may be any polyvinyl alcohol which is water-soluble and can be prepared by normal polymerization techniques. Generally, such polyvinyl alcohols are prepared by the hydrolysis of polyvinyl acetates. The degree of hydrolysis should preferably be at least 70%, but better from 80 to 99.9%. The polyglycerol polyglycidyl ethers (II-2) used are reaction products of glycerol and epichlorohydrin having molecular weights between approx. 250 and 1200. The aqueous polyurethane (I-3) is prepared from a polyol, for example polyester with glycol end groups, polyoxy-ethylene glycol, polyoxypropylene glycol, polyoxytetra-methylene glycol or acrylic polyols, and a diisocyanate, for example xylene diisocyanate, hexamethylene diiso-cyanate, dicyclohexylmethane 4,4'-diisocyanate, toluidine diisocyanate, phenylene diisocyanate, diphenylmethane 4,4'-diisocyanate and naphthalene 1,5-diisocyanate.

The preferred copolyester, acrylate and hydrophilic coatings may also comprise other known additives, for example antistats, wetting agents, surfactants, pH regulators, antioxidants, dyes, pigments, antiblocking agents, for example colloidal $SiO_2$, etc. (see, for example, EP-A-0 144 948=U.S. Pat. No. 4,571,363, EP-A-0 144 878=U.S. Pat. No. 4,493,872).

Between the base layer and the outer layers may optionally be disposed another intermediate layer. This may in turn includes the polymers described for the base layer. In a particularly preferred embodiment, the intermediate layer includes the polyesters used for the base layer. The intermediate layer may also comprise the customary additives described below. The thickness of the intermediate layer is generally greater than 0.3 µm and is preferably in the range from 0.5 to 15 µm, in particular in the range from 1.0 to 10 µm, more preferably in the range from 1.0 to 5 µm.

In the case of the two-layer and the particularly advantageous three-layer embodiment of the inventive biaxially oriented polyester film, the thickness of the outer layer (A) is preferably in the range from 1.0 to 7.0 µm, in particular in the range from 1.3 to 6.5 µm and more preferably in the range from 1.6 to 6.0 µm. When the thickness of the outer layer (A) is more than 7.0 µm, the peeling force rises markedly and is no longer within the preferred range. Furthermore, the peeling performance of the film is impaired. In contrast, when the thickness of the outer layer (A) is less than 0.8 µm, the film is generally no longer heatsealable.

The thickness of the other, non-sealable outer layer (C) may be the same as the outer layer (A) or different; its thickness is generally between 0.5 and 5 µm.

markedly and is no longer within the preferred range. Furthermore, the peeling performance of the film is impaired. In contrast, when the thickness of the outer layer (A) is less than 0.7 µm, the film generally no longer has the desired peeling properties.

The thickness of the other, nonsealable outer layer (C) may be the same as the outer layer (A) or different; its thickness is generally between 0.5 and 5 µm.

The total thickness of the inventive polyester film may vary within wide limits. It is preferably from 3 to 200 µm, in particular from 4 to 150 µm, preferably from 5 to 100 µm, and the base layer (B) has a proportion of preferably from 45 to 97% of the total thickness.

The base layer and the other layers may additionally comprise customary additives, for example stabilizers (UV, hydrolysis), flame-retardant substances or fillers. They are appropriately added to the polymer or to the polymer mixture before the melting.

The present invention also provides a process for producing the film. To produce the inventive heatsealable and peelable outer layer (A), the particular polymers (polyester I, polyester II, optionally further polymers, for example polyester-incompatible polymer (anti-PET polymer), for example masterbatch(es) for particles) are appropriately fed directly to the extruder for the outer layer (A). The materials can be extruded at from about 200 to 280° C. From a process engineering point of view (mixing of the different components), it has been found to be particularly favorable when the extrusion of the polymers for the outer layer (A) is carried out using a twin-screw extruder having degassing means.

The polymers for the base layer (B) and for the further outer layer (C) which is possibly present and, where appropriate, the intermediate layer are appropriately fed to the (coextrusion) system via further extruders. The white pigments for the white base layer (B) may be fed to the extruder for the base layer (B) by means of masterbatch technology via the drying process customary for the polyester. The polyester-incompatible polymer (anti-PET polymer) for the white base layer (B) is preferably added by metering to the dried polyester chips by means of a side feeder directly upstream of the extruder intake zone. The use of a side feeder prevents a polyester-incompatible polymer having a low softening or melting point from adhering together under the drying conditions customary for polyester.

The melts are shaped to flat melt films in a multilayer die and layered one on top of the other. Subsequently, the multilayer film is drawn off with the aid of a chill roll and optionally further rolls and solidified.

The biaxial stretching of the film is generally carried out sequentially. Simultaneous stretching of the film is also possible, but is not necessary. In the sequential stretching, preference is given to stretching first in longitudinal direction (i.e. in machine direction) and then in transverse direction (i.e. at right angles to machine direction). The stretching in longitudinal direction can be carried out with the aid of two rolls rotating at different rates in accordance with the desired stretching ratio. For transverse stretching, an appropriate tenter frame is generally used.

The temperature at which the stretching is carried out can be varied within a relatively wide range and depends transverse stretching ratio is generally in the range from 2.4:1 to 5.0:1, preferably from 2.6:1 to 4.5:1.

The particularly preferred temperature range in which the biaxial stretching is carried out in the case of the longitudinal stretching (MDO) is from 60 to 110° C. The heating temperatures of the film in the longitudinal stretching are in the range from 60 to 105° C. In the transverse stretching (TDO), the temperatures of the film are in the range from 90° C. (commencement of stretching) to 140° C. (end of stretching). The longitudinal stretching ratio in this preferred temperature range is in the range from 2.0:1 to 4.8:1, preferably from 2.3:1 to 4.6:1. The transverse stretching ratio is generally in the range from 2.4:1 to 5.0:1, preferably from 2.6:1 to 4.5:1.

The preferred and especially the particularly preferred temperatures in the MDO particularly effectively take account of the adherent behavior of outer layer (A) to rolls (metallic, ceramic or particularly coated roll surfaces).

Before the transverse stretching, the non-sealable surface of the film can be coated inline by the processes known per se. The inline coating may lead, for example, to improved adhesion between a metal layer or a printing ink and the film, to an improvement in the antistatic performance, in the processing performance or else to further improvement of barrier properties of the film.

In the subsequent heat-setting, the film is kept at a. temperature of preferably from 150 to 250° C. over a period of from about 0.1 to 10 s. Subsequently, the film is wound up in a customary manner.

The gloss of the film surface (B) in the case of a two-layer film, or the gloss of the film surface (C) in the case of a three-layer film, is preferably greater than 100 (measured to DIN 67530 based on ASTM-D 523-78 and ISO 2813 with angle of incidence 20°). In a preferred embodiment, the gloss of these sides is more than 110 and in a particularly preferred embodiment more than 120. These film surfaces are therefore suitable in particular for a further functional coating, for printing or for metallization.

The opacity of the film is preferably less than 20%. In a preferred embodiment, the opacity of the film is less than 16% and in a particularly preferred embodiment less than 12%.

A further advantage of the invention is that the production costs of the inventive film are not substantially above those of a film made of standard polyester. In addition, it is guaranteed that, in the course of the production of the film, offcut material which arises intrinsically in the operation of the film production can be reused for the film production as regrind in an amount of up to 60% by weight, preferably from 5 to 50% by weight, based in each case on the total weight of the film, without the physical properties of the film being significantly adversely affected.

The film according to the invention is outstandingly suitable, for example, for packaging foods and other consumable goods, in particular for the packaging of foods and other consumable goods in trays in which peelable polyester films are used for opening the packaging.

The table which follows (table 1) once again summarizes the most important preferred film properties.

Measurement of the Average Diameter $d_{50}$

The determination of the average diameter $d_{50}$ was carried out by means of laser on a Malvern Master Sizer (from Malvern Instruments Ltd., UK) by means of laser scanning (other measuring instruments are, for example, Horiba LA 500 or Sympathec Helos, which use the same measuring principle). To this end, the samples were introduced together with water into a cuvette and this was then placed in the measuring instrument. The dispersion is scanned by means of a laser and the signal is used to determine the particle size distribution by comparison with a calibration curve. The particle size distribution is characterized by two parameters, the median value $d_{50}$ (=measure of the position of the average value) and the degree of scatter, known as the SPAN98 (=measure of the scatter of the particle diameter). The measuring procedure is automatic and also includes the mathematical determination of the $d_{50}$ value. The $d_{50}$ value is determined by definition from the (relative) cumulative curve of the particle size distribution: the point at which the 50% ordinate value cuts the cumulative curve provides the desired $d_{50}$ value (also known as median) on the abscissa axis.

Measurement of the SPAN98

The determination of the degree of scatter, the SPAN98, was carried out with the same measuring instrument as described above for the determination of the average diameter $d_{50}$. The SPAN98 is defined as follows:

$$SPAN98 = \frac{d_{98} - d_{10}}{d_{50}}$$

The basis of the determination of $d_{98}$ and $d_{10}$ is again the (relative) cumulative curve of the particle size distribution (see above "Measurement of the average diameter $d_{50}$"). The point at which the 98% ordinate value cuts the cumulative curve provides the desired $d_{98}$ value directly on the abscissa

TABLE 1

| Outer layer (A) | Inventive range | Preferred | More preferred | Unit | Test method |
|---|---|---|---|---|---|
| Proportion of units in the inventive polyester, formed from aromatic dicarboxylic acids | 12 to 89 | 30 to 84 | 40 to 82 | mol % | |
| Proportion of units in the inventive polyester, formed from aliphatic dicarboxylic acids | 11 to 88 | 16 to 70 | 18 to 60 | mol % | |
| Polyester I | 0 to 50 | 5 to 45 | 10 to 40 | % by wt. | |
| Polyester II | 50 to 100 | 55 to 95 | 60 to 90 | % by wt. | |
| Particle diameter $d_{50}$ | 2.0 to 8 | 2.5 to 7 | 3.0 to 6 | μm | |
| Filler concentration | 1.0 to 10.0 | 2.5 to 10.0 | 4.0 to 10.0 | % by wt. | |
| Thickness of the outer layer A | 1.0 to 7.0 | 1.3 to 6.5 | 1.6 to 6.0 | μm | |
| Particle diameter/layer thickness ratio | >/=1.1 | >/=1.3 | >/=1.5 | | |
| Properties | | | | | |
| Thickness of the film | 3 to 200 | 4 to 150 | 5 to 100 | μm | |
| Minimum sealing temperature of (A) against APET/CPET trays | 165 | 155 | 150 | ° C. | |
| Seal seam strength of (A) against APET/CPET trays | 1.5 to 8 | 2.0 to 8 | 2.5 to 8 | N/15 mm | |
| Gloss of the outer layers A and C | >70 and >100 | >75 and >110 | >80 and >120 | | DIN 67530 |
| Opacity of the film | <20 | <16 | <12 | % | ASTM D 1003-52 |
| Water contact angle | >/=64 | >/=62 | >/=60 | ° | cf. description |

>/=: greater than/equal to

To characterize the raw materials and the films, the following test methods were used for the purposes of the present invention:

axis and the point at which the 10% ordinate value cuts the cumulative curve provides the desired $d_{10}$ value on the abscissa axis.

SV Value

The SV value of the polymer was determined by the measurement of the relative viscosity ($\eta_{rel}$) of a 1% solution in dichloroacetic acid in an Ubbelohde viscometer at 25° C. The SV value is defined as follows:

$$SV=(\eta_{rel}-1)\cdot 1000.$$

Glass Transition Temperatures $T_g$

The glass transition temperature $T_g$ was determined using film samples with the aid of DSC (differential scanning calorimetry). The instrument used was a Perkin-Elmer DSC 1090. The heating rate was 20 K/min and the sample weight approx. 12 mg. In order to eliminate the thermal history, the samples were initially preheated to 300° C., kept at this temperature for 5 minutes and then subsequently quenched with liquid nitrogen. The thermogram was used to find the temperature for the glass transition $T_g$ as the temperature at half of the step height.

Seal Seam Strength (Peeling Force)

To determine the seal seam strength, a film strip (100 mm long×15 mm wide) is placed on an appropriate strip of the APET/CPET tray on the APET side and sealed at the set temperature of >140° C., a sealing time of 0.5 s and a sealing pressure of 4 bar (HSG/ET sealing unit from Brugger, Germany, sealing jaw heated on both sides). In accordance with FIG. 2, the sealed strips are clamped into the tensile testing machine (for example from Zwick, Germany) and the 180° seal seam strength, i.e. the force required to separate the test strips, is determined at a removal rate of 200 mm/min. The seal seam strength is quoted in N per 15 mm of film strip (e.g. 3 N/15 mm).

Determination of the Minimum Sealing Temperature

The Brugger HSG/ET sealing unit as described above for the measurement of the seal seam strength is used to produce heatsealed samples (seal seam 15 mm×100 mm), and the film is sealed at different temperatures with the aid of two heated sealing jaws at a sealing pressure of 3 bar and a sealing time of 0.5 s. The 180° seal seam strength was measured as for the determination of the seal seam strength. The minimum sealing temperature is the temperature at which a seal seam strength of at least 1 N/15 mm is attained.

Roughness

The roughness $R_a$ of the film was determined to DIN 4768 at a cutoff of 0.25 mm. It was not measured on a glass plate, but rather in a ring. In the ring method, the film is clamped into a ring, so that neither of the two surfaces touches a third surface (for example glass).

Opacity

The opacity according to Holz was determined to ASTM-D 1003-52.

Gloss

The gloss of the film was determined to DIN 67530. The reflector value was measured as a characteristic optical parameter for the surface of a film. Based on the standards ASTM-D 523-78 and ISO 2813, the angle of incidence was set to 20°. A light beam hits the flat test surface at the angle of incidence set and is reflected or scattered by it. The light beams incident on the photoelectronic detector are displayed as a proportional electrical quantity. The measurement is dimensionless and has to be quoted together with the angle of incidence.

Tensile Strain at Break

The tensile strain at break of the film was measured to DIN 53455. The testing rate is 1%/min; 23° C.; 50% relative humidity.

Modulus of Elasticity

The modulus of elasticity of the film was measured to DIN 53457. The testing rate is 1%/min; 23° C.; 50% relative humidity.

Contact Angle with Water

The polarity of the surface was determined by measuring the contact angle of distilled water. The test took place at 23° C. and 50% relative humidity. A dispensing syringe is used to apply droplets of distilled water of width 1-2 mm to the film surface. Since the measurement is time-dependent owing to heat supplied by the lighting (evaporation), to charging or spreading, the needle remains in the droplet so that during the test the droplet is carefully enlarged, and the contact angle is then immediately read off using a goniometer eyepiece. (Advancing angle measurement.) The average is calculated from 5 measurements (cf., for example, ASTM-D 5946-01).

The invention is illustrated hereinbelow with reference to examples.

EXAMPLE 1

Chips of polyethylene terephthalate were fed to the extruder for the base layer (B). Chips of polyethylene terephthalate and particles were likewise fed to the extruder (twin-screw extruder) for the non-sealable outer layer (C). In accordance with the process conditions listed in the table below, the raw materials were melted and homogenized in the two respective extruders.

In addition, a mixture including polyester I and polyester II was prepared for the heatsealable and peelable outer layer (A). The mixture was fed to the twin-screw extruder with degassing for the sealable and peelable outer layer (A). In accordance with the process conditions detailed in the table below, the raw materials were melted and homogenized in the twin-screw extruder.

By coextrusion in a three-layer die, the three melt streams were then layered on top of one another and ejected via the die lip. The resulting melt film was cooled and a transparent, three-layer film having ABC structure was subsequently produced in a total thickness of 25 µm by a stepwise orientation in the longitudinal and transverse direction, fixing and subsequent corona treatment (2 kW/m²) of the C layer. The thicknesses of the outer layer A is 2 µm, that of the outer layer C 1 µm.

| | Outer layer (A), mixture of: |
|---|---|
| 20.0% by weight | of polyester I (=copolymer of 78 mol % of ethylene terephthalate, 22 mol % of ethylene isophthalate) having an SV value of 850. The glass transition temperature of polyester I is approx. 75° C. Polyester I additionally contains 6.0% by weight of SYLYSIA ® 430 (synthetic $SiO_2$, Fuji, Japan) having a particle diameter of $d_{50}$ = 3.4 µm, SPAN98 = 1.8. |
| 80% by weight | of polyester II (=copolymer containing 40 mol % of ethylene azelate, 50 mol % of ethylene terephthalate, 10 mol % of ethylene isophthalate) having an SV value of 1000. The glass transition temperature of polyester II is approx. 0° C. |
| | Base layer (B): |
| 100% by weight | of polyethylene terephthalate having an SV value of 800 |

-continued

| | Outer layer (C), mixture of: |
|---|---|
| 85% by weight | of polyethylene terephthalate having an SV value of 800; |
| 15% by weight | of a masterbatch of 99% by weight of polyethylene terephthalate (SV value of 800) and 1.0% by weight of SYLOBLOC ® 44 H (synthetic $SiO_2$, Grace, Worms), $d_{50}$ = 2.5 μm, SPAN98 = 1.9. |

The production conditions in the individual process steps were:

| Extrusion | Temperatures | A layer: | 2e+08 | ° C. |
|---|---|---|---|---|
| | | B layer: | | ° C. |
| | | C layer: | | ° C. |
| | Temperature of the takeoff roll | | 20 | ° C. |
| Longitudinal stretching | Heating temperature | | 70-100 | ° C. |
| | Stretching temperature | | 102 | ° C. |
| | Longitudinal stretching ratio | | 3.8 | |
| Transverse stretching | Heating temperature | | 105 | ° C. |
| | Stretching temperature | | 135 | ° C. |
| | Transverse stretching ratio | | 4 | |
| Setting | Temperature | | 230 | ° C. |
| | Time | | 3 | s |

According to measurements (table 2), the minimum sealing temperature of the film with respect to the APET side of APET/CPET trays is 120° C. The film was sealed to the APET side of APET/CPET trays at 140, 160, 180 and 200° C. (sealing pressure 4 bar, sealing time 0.5 s). Subsequently, strips of the bond of inventive film and APET/CPET tray were pulled apart by means of a tensile strain tester in accordance with the aforementioned test method (cf. FIG. 2). For all sealing temperatures, the films exhibited the desired peeling off from the tray according to FIG. 3b. The seal seam strengths measured are listed in column 3. For all sealing temperatures, peelable films were obtained. The seal seam strengths with respect to APET are within the medium range, i.e. the films can be removed from the tray without great force being applied. In addition, the film had the required good optical properties, the opacity was 5%, the gloss of the sides A and C was 120 and 130 respectively. The film had the desired improved adhesion; the contact angle to water was 63.7° C. The film had the desired handling and processing performance.

EXAMPLE 2

The film was produced as in example 1, but without corona treatment after the biaxial stretching. A latex having solids content 4.5% by weight, including a copolymer of 60% by weight of methyl methacrylate, 35% by weight of ethyl acrylate and 5% by weight of N-methylolacrylamide and a surfactant, was applied to the C layer of the polyester film as an adhesion promoter coating by the following process: the longitudinally stretched film was corona-treated (8 kW/m²) and then coated on the C layer with the above-described latex by reverse-gravure coating.

The biaxially stretched film was heat-set at 230° C. The dry weight of the coating was approx. 0.035 g/m² at a coating thickness of about 0.0025 μm.

The sealing and peeling properties of the film are as in example 1. The contact angle to water was 63.8°. The film was tested for its reprographic adhesion and gave good adhesion.

EXAMPLE 3

The film was produced as in example 2. An aqueous dispersion having 6% by weight of copolyester including 95 mol % of isophthalate, 5 mol % of sodium 5-sulfoisophthalate and 100 mol % of ethylene glycol, and 0.56% by weight of colloidal $SiO_2$ was applied to a polyester film as a coating by the following process:

The longitudinally stretched film was coated on the C layer with the above-described copolyester dispersion by reverse-gravure coating.

The biaxially stretched film was heat-set at 230° C. The dry weight of the coating was approx. 0.030 g/m² at a coating thickness of about 0.0025 μm.

The sealing and peeling properties of the film were as in example 1. The contact angle to water was 57°.

Two samples of the thus produced film coated on one side were introduced into a vacuum laboratory coater, in such a way that the coated side of one sample and the uncoated side of the other were metallized. The vacuum chamber was evacuated down to below 10 torr and about 500 Å of aluminum were applied by vapor deposition from a tungsten thread both to the uncoated side and to the coated sample.

Within 30 s after removal from the vacuum chamber, each sample was tested for "metal attrition". For this purpose, cotton wool was rubbed lightly over the metal surface of each sample investigated with the same number of strokes and approximately the same pressure. The "attrition performance" of the coated side of the film was rated as good.

EXAMPLE 4

The film was produced as in example 1, but without corona treatment after the biaxial stretching. An aqueous dispersion having solids content 7% by weight, including 50% by weight of the aromatic copolyester Al (copolyester containing 90

TABLE 2

| Seal seam strength with respect to APET/CPET trays | | | | Seal seam strength with respect to CPET trays | | | | Roughnesses | |
|---|---|---|---|---|---|---|---|---|---|
| 140° C. | 160° C. | 180° C. | 200° C. | 140° C. | 160° C. | 180° C. | 200° C. | Side A | Side C |
| N/15 mm | | | | N/15 mm | | | | μm | |
| 4 | 4.7 | 5 | 5.2 | 3.4 | 3.9 | 4.2 | 4.6 | 169 | 60 | mol % of terephthalate, 10 mol % of sodium 5-sulfoisophthalate, 80 mol % of ethylene glycol and 20 mol % of diethylene glycol), 45% by weight of the water-dispersible polymer B2 (polyvinyl alcohol having a degree of hydrolysis of 88 mol % and a degree of polymerization of 1700) and 5% by weight of inert particles D1 (colloidal $SiO_2$ having a particle diameter of 0.05 μm) was applied to a polyester film as a coating by the following process:

The longitudinally stretched film was coated with the above-described copolyester dispersion by reverse-gravure coating. The dry weight of the coating was approx. 0.040 g/m$^2$ at a coating thickness of about 0.05 μm.

The sealing and peeling properties of the film were as in example 1. The contact angle to water was less than 50°.

To assess the adhesion-promoting action of the coating, an aqueous polyvinyl acetyl solution (S-LecKX-1, produced by Sekisui Chemical Co., Ltd, Japan, referred to hereinbelow as KX-1) was applied to the coated film and dried. The coating solution had a concentration of 8% by weight and was applied in a layer thickness of 127 μm using a Baker applicator. The coated film was immediately placed in an oven for drying at 100° C. for 4 minutes. A black square (area: 12×12 cm) was printed on the surface of the dried KX-1 coating with an inkjet printer (BJC-600J, Canon Inc.) and dried under air at 23° C. and 50% relative atmospheric humidity for 12 hours. Adhesive tape (Cello-tape, Nichiban Inc., width: 18 mm) was stuck onto the printed area and pulled off rapidly. The extent of the printed surface removed with the adhesive tape was determined visually. The coated film exhibited good adhesion properties.

COMPARATIVE EXAMPLE 1

A film was produced as example 1, but without corona treatment. The contact angle to water was 65.5° and the adhesion to metal was poor.

The invention claimed is:

1. A coextruded, biaxially oriented polyester film which has a base layer (B) and has a heatsealable outer layer (A) that can be peeled from APET/CPET and from CPET, where
    the outer layer (A) comprises
        a) from 60 to 99% by weight of polyester and
        b) from 1 to 10% by weight of inorganic and/or organic particles with a median diameter $d_{50}$ of from 2 to 8 μm,
    and where
        c) the polyester is composed of from 12 to 89 mol % of units derived from at least one aromatic dicarboxylic acid and of from 11 to 88 mol % of units derived from at least one aliphatic dicarboxylic acid,
    where the total of the dicarboxylic-acid-derived molar percentages is 100, the non-sealable surface of the film has been rendered adhesion-promoting,
        d) the ratio calculated from the particle size $d_{50}$ of the particles and the layer thickness $d_A$ of the outer layer (A) is greater than or equal to 1.1, and
        e) said outer layer (A) exhibits a surface roughness, Ra, ranging from greater than 60 to 400 nm, as determined via DIN 4768.

2. The polyester film as claimed in claim 1, wherein the thickness of the outer layer (A) $d_A$ is from 1 to 7 μm.

3. The polyester film as claimed in claim 1, wherein the aromatic dicarboxylic acids have been selected from one or more of the following substances: terephthalic acid, isophthalic acid, and 2,6 naphthalenedicarboxylic acid.

4. The polyester film as claimed in claim 1, wherein the aliphatic dicarboxylic acids have been selected from one or more of the following substances: succinic acid, pimelic acid, suberic acid, azelaic acid, sebacic acid, glutaric acid, and adipic acid.

5. The polyester film as claimed in claim 1, wherein the polyester of the outer layer (A) contains from 12 to 89 mol % of terephthalate, from 0 to 25 mol % of isophthalate, from 11 to 88 mol % of azelate, from 0 to 50 mol % of sebacate, from 0 to 50 mol % of adipate, and more than 30 mol % of ethylene or butylene, based in each case on the total amount of dicarboxylate and, respectively, total amount of alkylene.

6. The polyester film as claimed in claim 1, wherein the outer layer (A) has a minimum sealing temperature of not more than 165° C. for sealing against APET/CPET or CPET trays.

7. The polyester film as claimed in claim 1, wherein the outer layer (A) has a seal seam strength of at least 1.5 N/15 mm of film width against APET/CPET or CPET trays.

8. The polyester film as claimed in claim 1, wherein the polyester of the outer layer (A) is prepared from two polyesters I and II.

9. The polyester film as claimed in claim 8, wherein the polyester I is composed of one or more aromatic dicarboxylates and of one or more aliphatic alkylenes.

10. The polyester film as claimed in claim 8, wherein the polyester I contains terephthalate units, isophthalate units, and ethylene units.

11. The polyester film as claimed in claim 8, wherein the proportion of the polyester I in the outer layer (A) is from 0 to 50% by weight.

12. The polyester film as claimed in claim 8, wherein the polyester I has a glass transition temperature above 50° C.

13. The polyester film as claimed in claim 8, wherein the polyester II is composed of one or more aliphatic dicarboxylates and of one or more aromatic dicarboxylates, and of one or more aliphatic alkylenes.

14. The polyester film as claimed in claim 8, wherein the polyester II contains azelate units, terephthalate units, isophthalate units, and ethylene units.

15. The polyester film as claimed in claim 8, wherein the proportion of the polyester II in the outer layer (A) is from 50 to 100% by weight.

16. The polyester film as claimed in claim 8, wherein the polyester II has a glass transition temperature below 20° C.

17. The polyester film as claimed in claim 1, which has three layers and has an A-B-C structure.

18. The polyester film as claimed in claim 17, wherein the outer layer (C) also comprises inorganic or organic particles.

19. The polyester film as claimed in claim 1, wherein the particles in the outer layer (A) have a SPAN 98 of ≦2.0.

20. The polyester film as claimed in claim 1, wherein the Wise layer (B) is composed of at least 80% by weight of thermoplastic polyester.

21. The polyester film as claimed in claim 1, wherein the polyester of the base layer (B) contains terephthalate units and/or isophthalate units, and ethylene units.

22. The polyester film as claimed, in claim 1, wherein the non-sealable film surface is rendered adhesion-promoting via corona treatment or flame treatment, and/or via a functional coating.

23. The polyester film as claimed in claim 1, wherein the functional coating is a copolyester coating or acrylate coating.

24. The polyester film as claimed in claim 1, wherein the film surface that has been rendered adhesion-promoting has a contact angle of ≦64° with respect to water.

25. A process for producing a polyester film as claimed in claim 1, encompassing the steps of
   a) producing a multilayer film via coextrusion and shaping of the melts to give flat melt films,
   b) corona treating and/or applying a functional coating to the non-sealable surface,
   c) biaxial stretching of the film, and
   d) heat-setting of the stretched film.

26. The process as claimed in claim 25, wherein the corona treatment of the non-sealable surface of the film takes place after the heat-setting process.

27. The process as claimed in claim 25, wherein the application of the functional costing to the non-sealable surface of the film takes place prior to the transverse stretching of the film.

28. Packaging material comprising a polyester film as claimed in claim 1.

29. Packaging material according to claim 28, wherein said packaging material comprises packaging material for foods and other consumable items, or as lid film for APET/CPET or CPET trays.

* * * * *

UNITED STATES PATENT AND TRADEMARK OFFICE
CERTIFICATE OF CORRECTION

| | | |
|---|---|---|
| PATENT NO. | : 7,396,578 B2 | Page 1 of 1 |
| APPLICATION NO. | : 10/984727 | |
| DATED | : July 8, 2008 | |
| INVENTOR(S) | : Peiffer et al. | |

It is certified that error appears in the above-identified patent and that said Letters Patent is hereby corrected as shown below:

Claims

Column 26
Claim 20, Line 52, delete "Wise" insert --base--

Signed and Sealed this

Ninth Day of September, 2008

JON W. DUDAS
*Director of the United States Patent and Trademark Office*